United States Patent
Vileid et al.

(10) Patent No.: US 6,778,500 B1
(45) Date of Patent: Aug. 17, 2004

(54) MIGRATION OF DOWNLINK TRAFFIC IN GPRS

(75) Inventors: Karsten Grøneng Vileid, His (NO); Per Magne Hoff, His (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 800 days.

(21) Appl. No.: 09/614,350

(22) Filed: Jul. 12, 2000

(30) Foreign Application Priority Data

Jul. 14, 1999 (NO) .......................................... 19993469

(51) Int. Cl.7 .............................................. H04L 12/26
(52) U.S. Cl. ...................... 370/232; 370/252; 370/465
(58) Field of Search ................................ 370/230, 231, 370/232, 233, 234, 235, 252, 253, 465, 468

(56) References Cited

U.S. PATENT DOCUMENTS

| | | | | |
|---|---|---|---|---|
| 5,132,961 A | | 7/1992 | Thiebaut et al. ............ 370/13 |
| 5,138,607 A | * | 8/1992 | Thiebaut et al. ............ 370/232 |
| 5,488,607 A | | 1/1996 | Vinel et al. .................... 370/17 |
| 5,649,110 A | * | 7/1997 | Ben-Nun et al. ........... 370/351 |
| 5,864,536 A | * | 1/1999 | Foglar ........................ 370/232 |
| 5,889,762 A | * | 3/1999 | Pajuvirta et al. ............ 370/230 |
| 6,349,088 B1 | * | 2/2002 | Ginzboorg et al. ......... 370/230 |
| 6,463,055 B1 | * | 10/2002 | Lupien et al. .............. 370/353 |
| 6,578,082 B1 | * | 6/2003 | Ho et al. ..................... 709/233 |
| 6,633,542 B1 | * | 10/2003 | Natanson et al. ........... 370/235 |

OTHER PUBLICATIONS

ETSI TS 101 299 (GSM 08.16 Version 6.3.0) Jul. 1999; *Digital Cellular Telecommunications System*, pp. 1–39.

* cited by examiner

*Primary Examiner*—Chau Nguyen
*Assistant Examiner*—Christine Ng

(57) ABSTRACT

The present invention relates to a method for improving the traffic handling capacity of a packet switched mobile telephone communication system. In said system there is introduced a load sharing function between the Base Station System and the Serving GPRS Switching Node. The purpose of the load sharing function is to distribute the traffic load from the SGSN to a BSS among the available Network Service Virtual Channels.

2 Claims, 3 Drawing Sheets

MIGRATION OF DOWNLINK TRAFFIC IN GPRS

The present invention relates to a method for improving the traffic handling capacity of a packet switched mobile telephone communication system.

TECHNICAL FIELD

GPRS is a new standard for packet switched mobile telephony. This invention proposes an improvement in the SGSN for the NS ETSI specification, see ref. [1], of the GPRS interface, i.e. the interface from SGSN towards BSS (downlink direction).

TECHNICAL BACKGROUND

Problem

On the Gb-interface, see FIG. 1, there are a number of links (NS-VCs) between the SGSN and the BSS. The number of links might vary from one to many hundreds. In the NS ETSI specification, see ref. [1], section 4.4.1, bullet two, it is stated that traffic related to a specific MS (LSP) should be transmitted on the same link (NS-VC). This will ensure in order delivery of packets from the SGSN to the BSS or vice-versa for one MS. Transmission capability of the different links might very well be different. The in-order delivery might be jeopardised if using multiple links for the same MS. Hence, if packet 1 is sent from the SGSN to the BSS on link 1, and then the next packet, packet 2, is sent on link 2, then we are not guaranteed that packet 1 will arrive before packet 2 at the BSS. According to ref. [1] section 4.4.1, bullet two, another link will be selected when the used link fails. In this link failure case it accepted to receive traffic out of order.

The specified Load sharing function in ETSI specification, ref. [1], section 4.4.1, covers the following use cases:

New LSP (MS) shall be allocated a NS-VC, and in order delivery of NS-SDU are preserved Link failure, another link will be selected, traffic might be received out of order Block/unblock of links (NS-VC), traffic shall be received in order The use case: "One link is congested" is not specified for the Load Sharing function in ref. [1].

The problem with not being able to migrate traffic for an MS from one link to another, is that if the link currently assigned gets congested then there is no way of reducing the traffic load on the congested link. I.e. if the link gets congested the MS can not send on another link which is not congested instead, since that might inflict out of order delivery of the packets. The problem is: "is it possible to migrate traffic (due to congestion) without inflicting in order delivery?"

From U.S. Pat. No. 5,649,110, there is known a method for equalizing (by buffering) and give priority to traffic in a communication network.

U.S. Pat. No. 5,488,607 relates to a method for evaluating the throughput in a packet switched system (ATM). A similar method is also known from U.S. Pat. No. 5,132,961.

ETSI Spec. GSM 08.16 relates to load sharing in case of

New subscribers (LSP/MS)

A break in the channel

Blocking/de-blocking of channels

However, none of the publications mentions what should be done when a channel is congested.

THE INVENTION

Introduction

The problem described above are solved according to the invention by introducing a load sharing function between the BSS and the SGSN. The load sharing function is situated in the network service control sublayer, which is a sublayer of the network service layer. The purpose of the load sharing function is to distribute the traffic load from the SGSN to a BSS (downlink traffic) among the available NS-VCs.

Between the SGSN and a BSS, there will be one or more NS-VCs for each NSE. An NSEI identifies a group of NS-VCs. The responsibility of the load sharing function is to distribute the NS SDU traffic among the available NS-VCs of the same group.

A requirement for the load sharing function is that it should ensure that NS SDUs with the same LSP should be sent on the same NS-VC, this to ensure that for each BVC, the in order delivery of all NS SDUs marked with the same LSP value are preserved.

The load sharing function is only invoked in the SGSN for downlink traffic.

The scope of the present invention is as defined in the appended claims.

DESCRIPTION OF THE INVENTION

Figure 1:
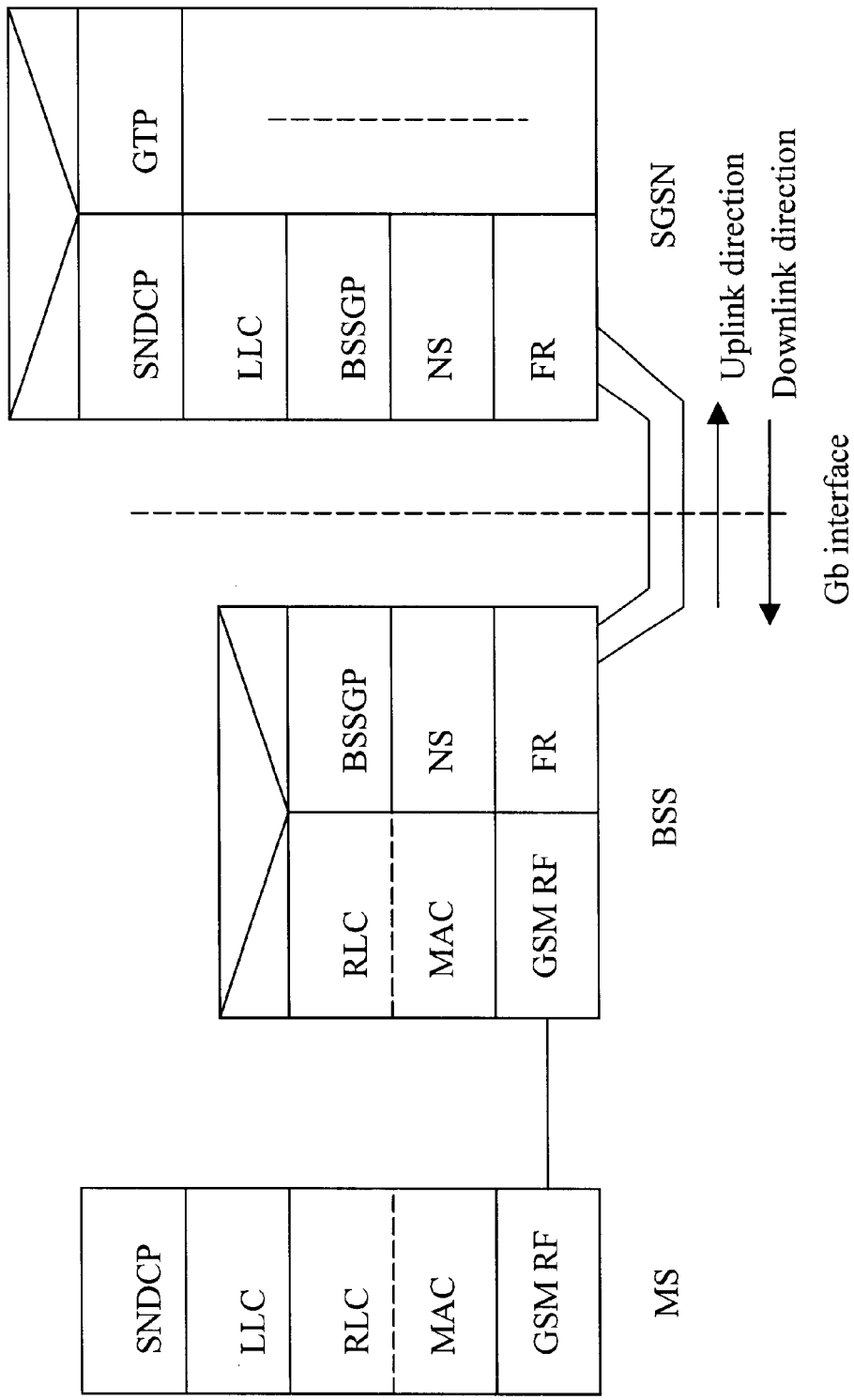
FIG. 1 is a schematically picture showing the transmission plane in GPRS.

The load sharing function has two main requirements, 1) to chose an available NS-VC from the group of NS-VCs, and
2) to ensure in order delivery of NS SDUs.

When the NS user (e.g. BSSGP) sends a packet down to the NS layer, the load sharing function will be the first functionality that will be invoked in the NS layer. BSSGP will provide the NS layer with two service primitive parameters, the NSEI and the LSP, that the load sharing function will use for selecting an NS-VC. The NSEI is used to select the group of NS-VCs and the LSP is used to select a particular NS-VC out of the group.

In its simplest form, the load sharing function will choose an NS-VC, based on the NSEI and the LSP and then ensure that all NS SDUs with the same set of NSEI and LSP will be transmitted on the same NS-VC.

Ref. [1] states that; 'For each BVC and NSEI, NS SDUs with the same LSP shall be sent on the same NS-VC'.

This does not take height for congestion on a NS-VC. The Frame Relay layer will in case of congestion on a PVC, and hence NS-VC, indicate this to the NS layer. According to the statement from ref. [1] above, the load sharing function would still have to transmit NS SDUs on the congested NS-VC. The only thing that could be ensured with this philosophy is that no new MSs would be allowed to start to send traffic on the congested NS-VC. I.e. there is no possibility to migrate traffic for one MS from a congested to a not congested NS-VC, after the MS has been assigned the particular NS-VC.

The reason for the statement above is that if traffic is to be migrated from a congested NS-VC the in-order delivery of NS SDUs will not be guaranteed. I.e. it is not guaranteed that the last NS SDU sent on the congested NS-VC will arrive at the BSS before the NS SDU sent on an alternative NS-VC.

However it will be argued that migration of traffic from one NS-VC to another NS-VC is possible without compromising the in order delivery requirement. This is possible since most of the traffic sources the GPRS network will support will be bursty sources, e.g. web-browsing. This implies that for a particular MS there will be periods of time that no traffic is received by the MS. The idea is to take advantage of this fact, where for each packet sent on an NS-VC the time of transmission will be stored. Next time a NS SDU with the same LSP[1] is transmitted the time the last NS SDU was transmitted is subtracted from the current time. If the resulting time is above a specified threshold the load sharing function is allowed to choose another NS-VC for this LSP, which will be done if the original NS-VC was congested. [1]This implies that the LSP must be unique, this is achieved by letting the LSP be equal to the PTMSI.

Time Between two NS SDUs Exceeds Threshold

When the load sharing function receives an NS SDU from the NS user, it will look up in a table where it uses the LSP as the key, to find the time the last NS SDU was sent for the PTMSI (LSP) in question. If the time exceeds a specified threshold the load sharing function is free to reselect an NS-VC. If the original NS-VC was congested an NS-VC that is not congested will be chosen. Hence traffic for an MS, that for a period of time has not generated any downlink traffic, will be possible to migrate to another NS-VC. The time threshold specified must be bigger than the maximum time through the Frame Relay network for an NS SDU. In this case the in order delivery of NS SDUs to the BSS will be ensured.

Graphical Description

Figure 2:
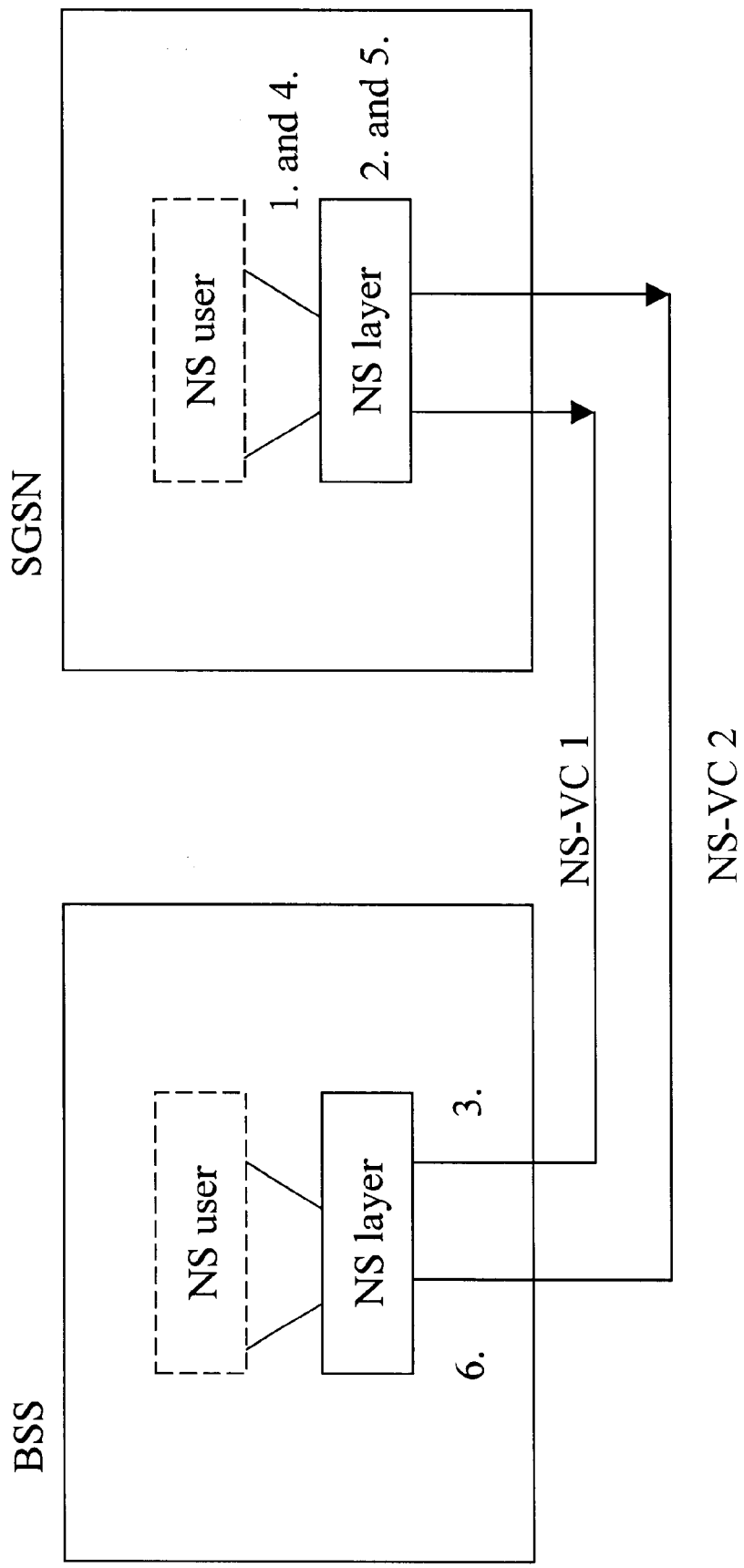
FIG. 2 is a graphical representation of the process for selecting channel between BSS and SGSN according to the invention.

Reference is now made to FIG. 2, which is a graphical representation of the process for transferring packets between BSS and SGSN according to the invention:

1. The NS user in SGSN sends a packet to the NS layer.
2. The load sharing function in the NS layer checks the LSP attached to the incoming packet. The LSP indicates that this packet should be sent on NS-VC I, the load sharing function checks if NS-VC 1 is congested. In this case it is assumed not to be congested, so the packet is sent towards the BSS on NS-VC1.
3. The packet is received on NS-VC 1 at the BSS.
4. The NS user sends a new packet to the NS layer time t later.
5. The load sharing function in the NS layer checks the LSP attached to the incoming packet. The LSP indicates that this packet should be sent on NS-VC 1, the load sharing function checks if NS-VC 1 is congested. In this case it is assumed to be congested. The load sharing function checks time t. If time t is bigger than the maximum time through the frame relay connection, the load sharing function is allowed to choose a new NS-VC. In this case time t is assumed to be bigger, so the load sharing function chooses to send the packet on NS-VC 2. All consecutive packets with the same NSEI and LSP will now be sent on NS-VC 2 as long as this is not congested.
6. The packet is received on NS-VC 2 at the BSS.

Figure 3:
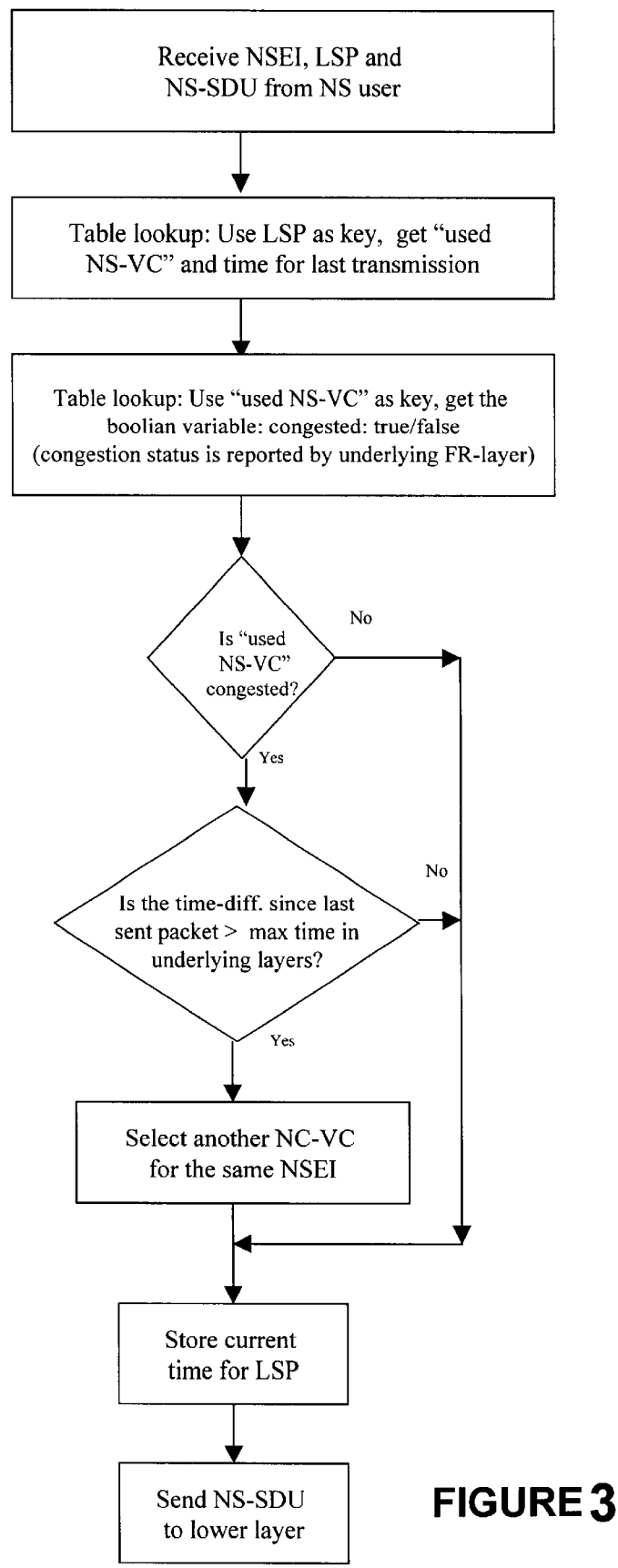
FIG. 3 is a flow chart describing the new logic in this patent.

FIG. 3 shows the logic used at sender-side.

Advantages

The invention will ensure that it is possible to migrate downlink traffic from a congested NS-VC to a not congested NS-VC and preserving in order delivery. An NS-VC uses a frame relay PVC and hence congestion on an NS-VC implies that the there is congestion on the underlying frame relay PVC. Without the inventive arrangement all of these frame relay PVCs have to be overdimensioned in order to give acceptable performance in worst case situations. With the inventive arrangement each of the PVCs do not have to cope with the worst case situations since it is now possible to migrate traffic among them.

The invention is an enhancement of the ETSI specification in ref. [1]. However the invention does not inflict any deviation from this specification. Hence it can be implemented and still be compliant to the specification.

Broadening

The solution proposed can equally well be implemented in the BSS for the uplink traffic towards SGSN.

Abbreviation and Terminology

| Abbreviation/Terminology | Description |
| --- | --- |
| GPRS | General Packet Radio Service |
| SGSN | Serving GPRS Switching Node |
| BSS | Base Station System |
| MS | Mobile Station |
| GPRS | General Packet Radio Service |
| SGSN | Serving SPRS Switching Node |
| BSS | Base Station System |
| MS | Mobile Station |
| P-TMSI | Packet Temporary Mobile Station Identity |
| NSE | Network Service Element |
| NSEI | Network Service Element Identifier |
| NS-VC | Network Service Virtual Channel |
| SDU | Service Data Unit |
| LSP | Link Selector Parameter |
| BSSGP | BSS GPRS Protocol |
| BVC | BSSGP Virtual Channel |
| PVC | Permanent Virtual Channel |
| NSC | Network Service Control |

References

[1] GSM 08.16: "Digital Cellular telecommunications system (Phase 2+); General Packet Radio Service (GPRS); Serving GPRS Support Node (SGSN) interface; Network Service" v.6.2.0, April 1999.

What is claimed is:

1. A method for optimal selection of channel for efficient transmission of packets in a packet switched mobile telephone network, which network comprises a number of Mobile Stations (MS), a number of Base Station Systems (BSS), a number of Serving GPRS Switching Nodes (SGSN) and a number of Network Service Virtual Channels (NS-VC) between SGSN(s) and BSS(s), said method comprising the following steps:

for each packet related to a Link Selector Parameter (LSP) store the time of transmission for last packet, next time a packet with the same (LSP) is to be sent, the time last packet was transmitted is subtracted from the current time, if the resulting time is above a specified threshold, and the channel is reported as congested, another channel is chosen for this LSP, wherein the time of transmission is stored in a table with the LSP as the key, and when a new packet is received from the NS user, the time of transmission is looked up to find the time the last packet was sent for the LSP in question, and wherein a unique identifier associated with a MS is used as LSP.

2. An arrangement for improving the traffic handling capacity of a packet switched mobile telephone communication system, which system comprises a number of Mobile Stations (MS), a number of Base Station Systems (BSS), a number of Serving GPRS Switching Nodes (SGSN) and a number of Network Service Virtual Channels (NS-VC) between SGSN(s) and BSS(s), comprising a load sharing function between BSS and SGSN, which load sharing function is adapted to store the time of transmission for each packet sent towards an MS, and next time a packet with the same Link Selector Parameter (LSP) is transmitted, the time last packet was transmitted is subtracted from the current time, if the resulting time is above a specified threshold, and the channel is reported as congested, another channel is chosen for this LSP, wherein said load sharing function comprises a table wherein is stored the time of transmission of each packet with the LSP as key, and wherein the load sharing function is adapted also to function in the other direction of transmission when packets are sent towards the SGSN.

* * * * *